United States Patent [19]

Toyoda et al.

[11] Patent Number: 4,931,617

[45] Date of Patent: Jun. 5, 1990

[54] ELECTRICALLY CONDUCTIVE COATING FOR COVER OF INDUSTRIAL ROBOT

[75] Inventors: Kenichi Toyoda, Hino; Nobutoshi Torii, Hachioji; Hitoshi Mizuno; Masanao Miyawaki, both of Minamitsuru, all of Japan

[73] Assignee: Fanuc Ltd., Minimatsuru, Japan

[21] Appl. No.: 313,970

[22] PCT Filed: Jun. 14, 1988

[86] PCT No.: PCT/JP88/00583

§ 371 Date: Feb. 2, 1989

§ 102(e) Date: Feb. 2, 1989

[87] PCT Pub. No.: WO88/10179

PCT Pub. Date: Dec. 29, 1988

[30] Foreign Application Priority Data

Jun. 24, 1987 [JP] Japan ................................ 62-157301

[51] Int. Cl.$^5$ ............................................. B23K 9/32
[52] U.S. Cl. .............................. 219/125.1; 174/35 MS; 901/42
[58] Field of Search ..................... 219/125.1; 901/42; 361/424, 212, 220; 174/35 MS

[56] References Cited

U.S. PATENT DOCUMENTS

| | | | |
|---|---|---|---|
| 4,670,347 | 6/1987 | Lasik et al. | 174/35 MS |
| 4,738,875 | 4/1988 | Hammond et al. | 174/35 MS |
| 4,831,210 | 5/1989 | Larson et al. | 174/35 MS |

FOREIGN PATENT DOCUMENTS

| | | |
|---|---|---|
| 49-116505 | 10/1974 | Japan . |
| 59-90994 | 5/1984 | Japan . |
| 60-130697 | 9/1985 | Japan . |
| 60-52696 | 11/1985 | Japan . |
| 61-199387 | 12/1986 | Japan . |

OTHER PUBLICATIONS

Abstract from European Patent 0200513, 11/1986.

Primary Examiner—Clifford C. Shaw
Attorney, Agent, or Firm—Staas & Halsey

[57] ABSTRACT

An industrial robot for use in TIG arc welding or the like includes plastic covers for motors or the like. The plastic covers having an electrically conductive coating, and thus have an electrically conductive property, and are connected to a robot body, to thereby obtain a shielding effect similar to that of iron plate covers or the like.

7 Claims, 3 Drawing Sheets

ELECTRICALLY CONDUCTIVE COATING FOR COVER OF INDUSTRIAL ROBOT

TECHNICAL FIELD

The present invention relates to an industrial robot used in arc welding or the like, and more particularly to an industrial robot provided with a plastic cover having an electrically conductive coating to reduce the influence of noise.

BACKGROUND ART

When industrial robots for arc welding or the like are used for a welding process in which high-frequency noise is produced, for example, TIG welding, the high-frequency noise caused by an arc enters signal lines and causes problems such as malfunctions or the generation of an alarm. To avoid such problems, covers for components such as servomotors are made of a metallic plate, e.g., iron plate or the like. The iron plate cover is fixed by screws, although a coating thereon is removed from the portion at which the screws are used, to provide a shielding effect for signal lines to be arranged therein. Obviously, all of the signal lines may use shielded wires to avoid the influence of noise, but it is difficult to use shielded wires for all of the signal lines, due to structural limitations peculiar to industrial robots.

Plastic covers are now widely used as the covers for industrial robots, to meet demands for a reduction of manufacturing costs and for a lighter weight, but this type of cover does not provide the shielding effect obtained from the iron plate cover.

SUMMARY OF THE INVENTION

An object of the present invention is to provide an industrial robot which solves the above-mentioned problems and which uses a plastic cover coated with an electrically conductive coating to reduce the influence of noise.

To solve the above problems, the present invention provides, as shown in FIG. 1, an industrial robot for use in TIG arc welding or the like, including:

a plastic cover for a motor or other components; and an electrically conductive coating on the plastic cover, the plastic cover being electrically connected to a robot body.

The plastic cover with the electrically conductive coating has an electrically conductive property and, since it is electrically connected to the robot body, provides a shielding effect equal to that of an iron plate cover or the like.

DETAILED DESCRIPTION OF THE PREFERRED EMBODIMENTS

An embodiment of the present invention will hereinafter be described with reference to the drawings.

Figure 1:
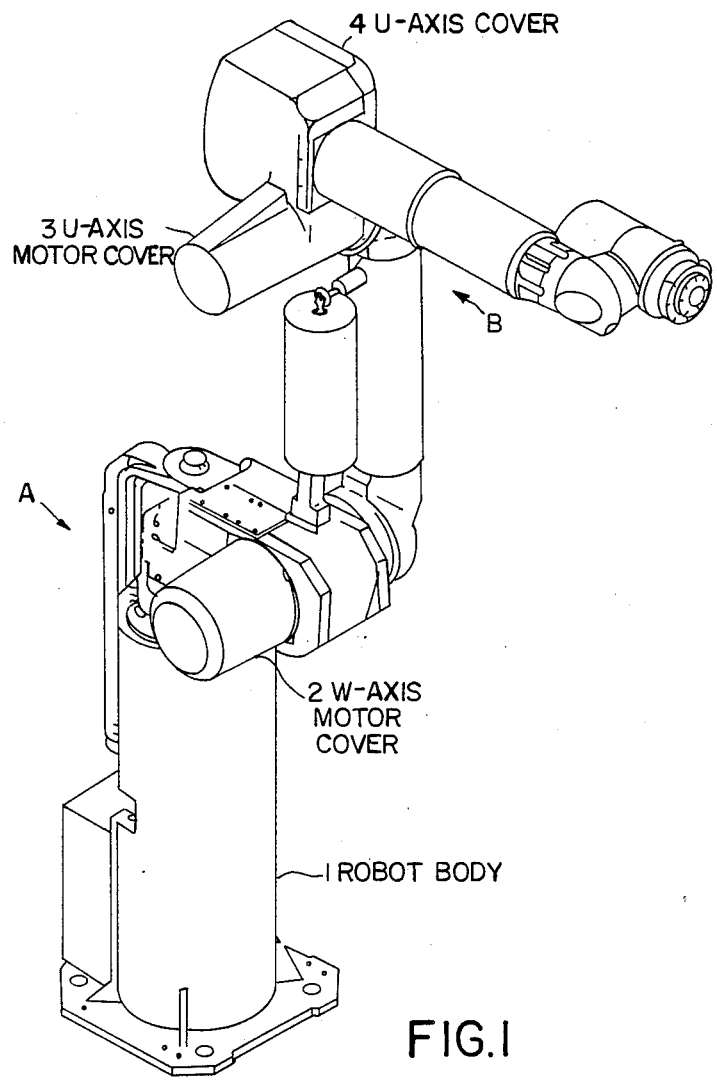
FIG. 1 is a perspective view illustrating an entire arrangement of an industrial robot according to an embodiment of the present invention.

FIG. 1 shows the entire arrangement of an industrial robot according to an embodiment of the present invention. The illustrated robot is a vertical joint type. Numeral 1 denotes a robot body, which although not shown, is connected at the bottom thereof to a shielded wire grounded on the side of a control apparatus. Therefore, the robot body 1 has a ground level potential. Denoted at 2 is a W-axis motor cover, 3 a U-axis motor cover, and 4 a U-axis cover. The inside surfaces of these covers, all made of a plastic material, have an electrically conductive coating and are secured to the robot body 1 by screws. Consequently, the plastic covers have a shielding effect equal to that of iron plate covers employed in the prior art.

Figure 2:
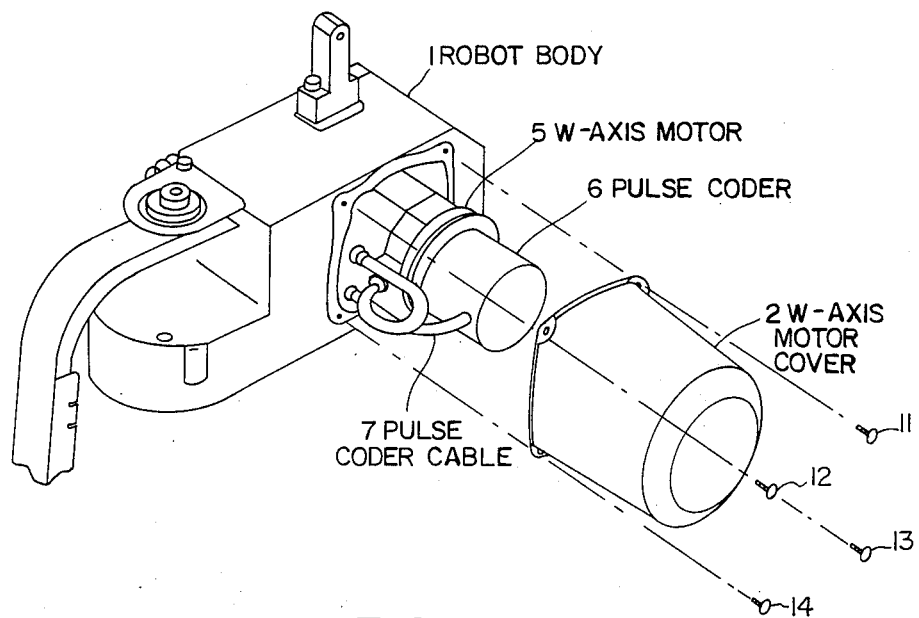
FIG. 2 is a perspective partially exploded view illustrating part of the robot in detail, as viewed from arrow A in FIG. 1.

FIG. 2 illustrates part of the robot in more detail, as viewed from arrow A in FIG. 1. In the figure, the W-axis motor cover 2 appearing in FIG. 1 is made of a plastic material, the inside surface of which includes an electrically conductive coating containing nickel. Numeral 5 denotes a W-axis motor, and 6 a pulse coder for the W-axis motor 5. The pulse coder 6 is connected to the control apparatus by a pulse coder cable 7. If, for example, the pulse coder cable 7 does not use a shielded wire and the W-axis motor cover 2 the electrically conductive coating, problems such as an incorrect position detection or a generation of an alarm, due to high-frequency noise produced by the TIG arc may occur In this embodiment, an electrically conductive coating is applied to the W-axis motor cover 2, and this cover 2 is secured to the robot body 1 by screws 11, 12, 13, and 14. Therefore, the W-axis motor cover 2 is maintained at a ground level potential and has a satisfactory shielding effect, whereby the above-mentioned malfunction and generation of an alarm are avoided.

Figure 3:
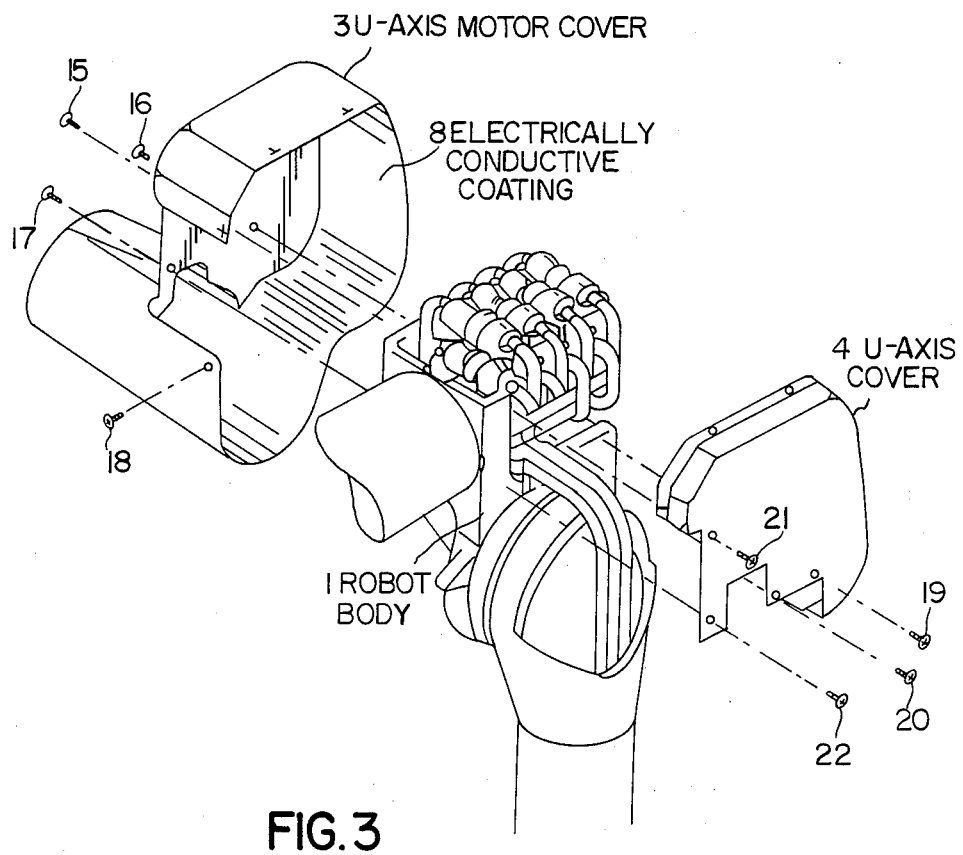
FIG. 3 is a perspective partially exploded view illustrating part of the robot in detail, as viewed from arrow B in FIG. 1.

FIG. 3 shows part of the robot in detail, as viewed from arrow B in FIG. 1. In the figure, the U-axis motor cover 3 has the inside surface thereof coated with an electrically conductive coating 8 containing nickel. The U-axis motor cover 3 is secured to the robot body 1 by screws 15, 16, 17, and 18, and thus the signal cables inside the cover 3 are shielded from high-frequency noise produced by the TIG arc. The U-axis cover 4 is secured to the robot body 1 by screws 19, 20, 21, and 22 and, similar to the U-axis motor cover 3, serves to shield the signal cables located therein.

Accordingly, an electrically conductive coating is used on plastic covers for units including signal cables, such as motors, and the covers are connected to the robot body. Thus, the plastic covers have a reduced potential level equivalent to a ground level, to thereby obtain the same shielding effect as that of iron plate covers or the like.

In the foregoing embodiment, an electrically conductive coating containing nickel is used as the electrically conductive coating, but similar effects can be obtained with an electrically conductive coating containing copper or the like.

As described above, according to the present invention, an electrically conductive coating is formed on the plastic covers and the covers are connected to the robot body. Therefore, the plastic covers can provide a shielding effect similar to that of iron plate covers, and can be used in industrial robots adapted for TIG welding.

We claim:

1. An industrial robot for use in TIG arc welding, or the like, wherein high voltage produces high frequency noise, comprising:

a robot body having a ground level potential;

a plastic cover for an electrical component and for signal lines connected to the electrical component;

an electrically conductive coating on said plastic cover; and screw means for electrically connecting the coating directly to the robot body, said coating having a reduced potential level equivalent to the ground level and shielding said signal lines located inside the cover from the high frequency noise generated outside the robot body during welding.

2. An industrial robot according to claim 1, wherein said electrically conductive coating is applied to an inside surface of said plastic cover.

3. An industrial robot according to claim 1, wherein said electrically conductive coating comprises an electrically conductive coating containing nickel.

4. An industrial robot according to claim 1, wherein said electrically conductive coating comprises an electrically conductive coating containing copper.

5. An industrial robot according to claim 1, wherein the electrical component is a servomotor.

6. An industrial robot according to claim 1, wherein the electrical component is a pulse coder cable.

7. An industrial robot according to claim 1, wherein the electrical component is a signal cable.

* * * * *

UNITED STATES PATENT AND TRADEMARK OFFICE
CERTIFICATE OF CORRECTION

PATENT NO. : 4,931,617

DATED : June 5, 1990

INVENTOR(S) : Kenichi Toyoda, Nobutoshi Torii, Hitoshi Mizuno and Masanao Miyawaki It is certified that error appears in the above-identified patent and that said Letters Patent is hereby corrected as shown below:

Column 2, line 24, after "2" insert --lacks--.

Signed and Sealed this

Second Day of October, 1990

*Attest:*

HARRY F. MANBECK, JR.

*Attesting Officer*     *Commissioner of Patents and Trademarks*